United States Patent [19]

Sakai et al.

[11] Patent Number: 4,545,664
[45] Date of Patent: Oct. 8, 1985

[54] SIGNAL CIRCUIT FOR AN AUTOMATIC FOCUSING LENS

[75] Inventors: Shinji Sakai, Tokyo; Takashi Kawabata, Kamakura, both of Japan

[73] Assignee: Canon Kabushiki Kaisha, Tokyo, Japan

[21] Appl. No.: 516,439

[22] Filed: Jul. 22, 1983

[30] Foreign Application Priority Data

Jul. 28, 1982 [JP] Japan .................. 57-130394

[51] Int. Cl.⁴ .................................. G03B 13/18
[52] U.S. Cl. ................................. 354/400
[58] Field of Search ............... 354/400, 402, 286, 404, 354/408, 409

[56] References Cited

U.S. PATENT DOCUMENTS

| | | | |
|---|---|---|---|
| 4,067,031 | 1/1978 | Enomoto | 354/400 |
| 4,293,206 | 10/1981 | Tokutomi et al. | 354/400 |
| 4,348,089 | 9/1982 | Shenk | 354/400 X |
| 4,416,526 | 11/1983 | Tomori et al. | 354/286 |
| 4,429,965 | 2/1984 | Enomoto et al. | 354/402 |

Primary Examiner—L. T. Hix
Assistant Examiner—David M. Gray
Attorney, Agent, or Firm—Fitzpatrick, Cella, Harper & Scinto

[57] ABSTRACT

A signal circuit for an automatic focusing lens is disclosed which has a displacement monitoring signal generator for generating a displacement monitoring signal representing the displacement of the lens by repeatedly turning on and off in accordance with the movement of the lens. The signal circuit is further provided with a limit signal generator for generating limit signals which represent that the lens has been moved to an infinity and a minimum-focusing-point. The displacement monitoring signal generator is connected to the limit signal generator and the output of the displacement monitoring signal is inhibited in accordance with the output of the limit signal, thereby preventing such a problem that the operation to move the lens will have been continued after the lens has been moved to the infinity or minimum-focusing-point.

8 Claims, 3 Drawing Figures

SIGNAL CIRCUIT FOR AN AUTOMATIC FOCUSING LENS

BACKGROUND OF THE INVENTION

1. Field of the Invention

The present invention relates to a signal circuit for use in an automatic focusing lens which can be coupled to a camera having an automatic focusing system capable of automatic focus detection, and which moves the lens in accordance with an output from the automatic focusing system.

2. Description of the Prior Art

There are conventionally, a camera capable of an automatic focus detection, and an automatic focusing lens having a lens driving system for driving a lens on the basis of the detection information from the camera when the automatic focusing lens is connected to the camera. It is also well known, for example, in U.S. Pat. No. 4,067,031 (issued on Jan. 3, 1978) that in the automatic focusing lens, the lens is moved by a motor and that there is provided a limit switch which is changed-over when the lens has been moved to the infinity or minimum-focusing-point so that power supply to the motor is inhibited, and that when the lens has been moved to the infinity or minimum-focusing-point, the succeeding movement of the lens is inhibited.

On the other hand, in Japanese Patent Application Nos. 204953/1981 (filing date of the application is Dec. 17, 1981) and 205786/1981 (filing date of application is Dec. 18, 1981), owned in common herewith, the present applicants have already proposed a signal circuit for an automatic focusing lens having a displacement monitoring signal generator for generating a pulse-like displacement monitoring signal which represents the displacement of the lens by repeatedly turning on and off in accordance with the movement of the lens in order to control the displacement of the lens by a motor; wherein by detecting that the displacement monitoring signal to be output in response to the power supply to the motor is not provided for a predetermined period of time, the above-mentioned signal circuit discriminates whether or not the lens has been moved to the infinity or minimum-focusing-point, so that the circuit carries out the necessary operation such as stoppage of the power supply to the lens driving motor or the like. This automatic focusing lens has the advantage that it is possible to easily discriminate whether or not the lens has moved to the infinity or minimum-focusing-point in accordance with the detection of the displacement monitoring signal necessary to control the displacement of the lens; however on the contrary, it has a disadvantage, as follows. That is to say, for example, in the case that the generator for generating a pulse-like displacement monitoring signal in accordance with the movement of the lens is constituted by a comb tooth-like contact member and a brush adapted to slide on this comb tooth-like contact member in association with the movement of the lens, if the lens locates at the infinity or minimum-focusing-point and the brush is positioned at the change point of the comb tooth-like contact member, a pulse-like signal is generated from the output terminal of the displacement monitoring signal due to chattering, so that the discrimination that the lens has moved to the limit position cannot be performed.

SUMMARY OF THE INVENTION

The present invention was made in consideration of such circumstances. It is an object of the invention to provide a signal circuit for an automatic focusing lens in which, when the lens has been moved to the limit position of the infinity or minimum-focusing-point, a false displacement monitoring signal not occur at the output terminal of the travelling amount monitoring signal, so that secure control for the movement of the lens is surely performed.

Another object of the invention is to provide a signal circuit for an automatic focusing lens which can realize the above object without increasing the number of output terminals for transmission of the signal from the automatic focusing lens to the camera.

Still other objects of the present invention will become apparent from the following description of preferred embodiments, taken in conjunction with the accompanying drawings.

DETAILED DESCRIPTION OF THE PREFERRED EMBODIMENTS

Figure 1:
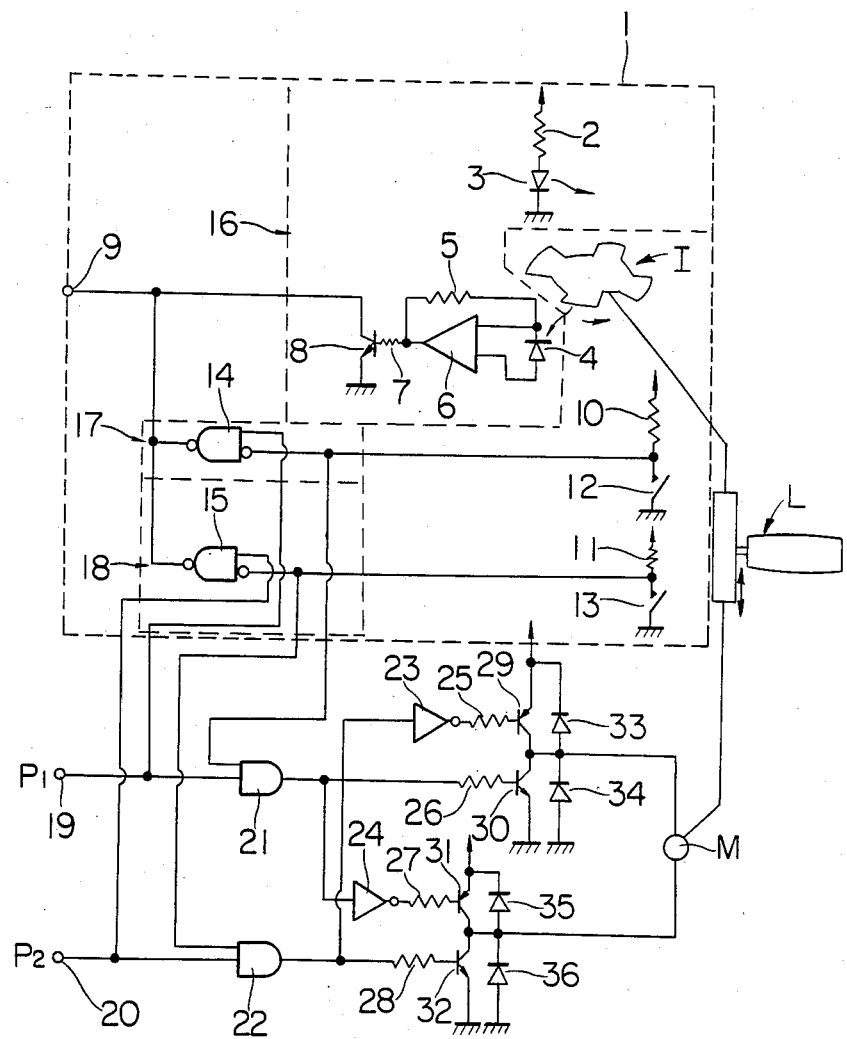
FIG. 1 is a circuit diagram showing an embodiment of a signal circuit for an automatic focusing lens of the present invention.

Referring to FIG. 1, a signal circuit 1 in an embodiment of the present invention includes: a pull-up resistor 2; a light emitting diode 3; a light receiving element 4; a feedback resistor 5; an operational amplifier 6; a resistor 7; a transistor 8; an output terminal 9; pull-up resistors 10 and 11; an infinity-limit switch 12 which is turned on when a lens L reaches the infinity-point position; a minimum-focusing-point limit switch 13 which is turned on when the lens reaches the minimum-focusing-point position; and NAND gates 14 and 15 with open collectors. The light emitted by the light emitting diode 3 is projected on a code plate I which has continuous on-off patterns and moves in association with the movement of the lens or on a tooth portion of a gear or the like for driving the lens, and the light receiving element 4 receives the light which passes through or is reflected by the code plate or tooth portion. The circuit constituted by the pull-up resistor 2, the light emitting diode 3, the light receiving element 4, the feedback resistor 5, the operational amplifier 6, the resistor 7 and the transistor 8 shows an example of a displacement monitoring signal generator 16. An infinity limit switch means 17 is constituted by the pull-up resistor 10, infinity-point limit switch 12 and NAND gate 14. A minimum-focusing-point limit switch means 18 is constituted by the pull-up resistor 11, minimum-focusing-point limit switch 13 and NAND gate 15.

In this embodiment, the displacement monitoring signal generator 16, infinity limit switch means 17 and minimum-focusing-point limit switch means 18 are connected in parallel with the common output terminal 9 among them. The infinity limit switch 12 and the minimum-focusing-point limit switch 13 are arranged just before the infinity point and minimum focusing point, respectively.

Drive direction signal input terminals 19 and 20 are connected to the camera body. A lens driving circuit is constituted by these drive direction input terminals 19 and 20, the elements 21-36 and a lens driving motor M. Reference numerals 21 and 22 denote AND gates; 23 and 24 denote inverters; 25-28 show resistors; 29-32 represent transistors; and 33-36 denote diodes to prevent the application of the back electromotive force of the lens driving motor M between the collectors and emitters of the transistors 29-32.

The operation of this circuit of FIG. 1 will now be described. When a drive direction signal $P_1$ which indicates the command for moving the lens in the direction of the infinity-point is transferred from the camera, the drive direction signal input terminal 19 becomes higher level. At this time, where the lens locates at the position nearer than the infinity position, since the infinity limit switch 12 is turned off, and a higher-level signal is applied through the pull-up resistor 10 to one input terminal of the AND gate 21, the input of the drive direction signal $P_1$ causes an output of the AND gate 21 to become higher level, and the transistor 30 to be turned on through the resistor 26. At the same time, an output of the inverter 24 becomes lower level, causing the transistor 31 to be turned on through the resistor 27. At this time, since the drive direction signal input terminal 20 is at a lower level, the output of the AND gate 22 also becomes lower level, and causes the transistor 32 to be turned off through the resistor 28. An output of the inverter 23 becomes higher level, causing the transistor 29 to be turned off through the resistor 25. Therefore, the lens driving motor M is energized through the transistors 30 and 31, so that the driving motor M advances the lens in the infinity-point direction.

When the lens moves by the operation of the lens driving motor M, the code plate or tooth portion of the gear on which the light is projected by the light emitting diode 3 also moves in association therewith, so that the transmitted light or reflected light to be received by the light receiving element 4 is turned on and off. An output of the light receiving element 4 is amplified by the operational amplifier 6, and turns the transistor 8 on and off to generate pulse-like displacement monitoring signals consisting of on-off signals representing a number corresponding to the displacement of the lens.

At this time, a higher-level signal is applied from the pull-up resistor 10 and the NAND gate 14, and the drive direction signal $P_1$ having a higher level is also applied thereto from the drive direction signal input terminal 19 so that the NAND gate 14 outputs a higher-level signal. A higher-level signal is applied through the pull-up resistor 11 and a lower-level signal is applied through the drive direction signal input terminal 20 to the NAND gate 15, so that the NAND gate 15 outputs a higher-level signal. Thus, the displacement monitoring signal is generated from the output terminal 9.

In this state, when the lens advancing operation in the infinity point direction is continued and the lens reached the infinity-point position, the infinity-point limit switch 12 is turned on. Hence, the output of the AND gate 21 is inverted into lower level and the transistors 30 and 31 are turned off, so that the lens driving motor M is stopped. At the same time, since the infinity limit switch 12 is turned on, the output of the NAND gate 14 becomes lower level. The lower level signal makes the output terminal 9 become lower level to erase the displacement monitoring signal, thereby transmitting a lower-level signal as a limit signal from the output terminal 9 to the camera. In this way, the detection of infinity-point can be performed.

On the other hand, when a drive direction signal $P_2$ which indicates a command for moving the lens in the direction of the minimum-focusing-point is transmitted from the camera to the minimum-focusing-point, the drive direction signal input terminal 20 becomes higher level. At this time, if the lens is not located at the minimum-focusing-point, the minimum-focusing-point limit switch 13 is turned off and a higher-level signal is applied through the pull-up resistor 11 to one input terminal of the AND gate 22. Thus, by the input of the drive direction signal $P_2$, the output of the AND gate 22 becomes higher level, and the transistor 32 turns on through the resistor 28. At the same time, the output of the inverter 23 becomes lower level, causing the transistor 29 to be turned on through the resistor 25. At that time, since the drive direction signal input terminal 19 is at a lower level, the output of the AND gate 21 also becomes lower level, this turns off the transistor 30 through the resistor 26 and the output of the inverter 24 becomes higher level, thereby turning off the transistor 31 through the resistor 27. Thus, the lens driving motor M is energized through the transistors 29 and 32, so that the lens driving motor M advances the lens in the minimum-focusing-point direction.

The displacement monitoring signal representing a number of on-off signals corresponding to displacement of the lens is generated by the displacement monitoring signal generator 16 in the same way as above. At this time, since the outputs of the NAND gates 14 and 15 are at higher levels, the displacement monitoring signal is transmitted from the output terminal 9 to the camera.

The NAND gates 14 and 15 are used to apply the directional property to the infinity limit switch means 17 and the minimum-focusing-point limit switch means 18. Now assuming that the lens locates at the infinity position and that the drive direction is the minimum-focusing-point direction, two inputs of the NAND gate 14 become lower level and its output becomes higher level, and two inputs of the NAND gate 15 become higher level and its output becomes higher level. Therefore, a lower-level limit signal is not provided from the output terminal 9, so that the lens driving operation can be executed.

Likewise, even if the lens locates at the minimum-focusing-point, and the drive direction is the infinity-point direction, both outputs of the NAND gates 14 and 15 become higher level, so that a lower-level limit signal is not provided from the output terminal 9.

In this embodiment, all of the circuits shown in FIG. 1 are equipped within a lens barrel which is detachably connected to the camera. Therefore, by attaching the lens to the camera, each of the terminals 9, 19 and 20 is connected to the terminal corresponding to the terminal 9, 19 or 20 respectively of the camera. Thus, the signals corresponding to the focus detecting operation can be applied from the camera to the terminals 19 and 20, and the displacement monitoring signal and the limit signal can be transmitted from the terminal 9 to the camera.

Figure 2:
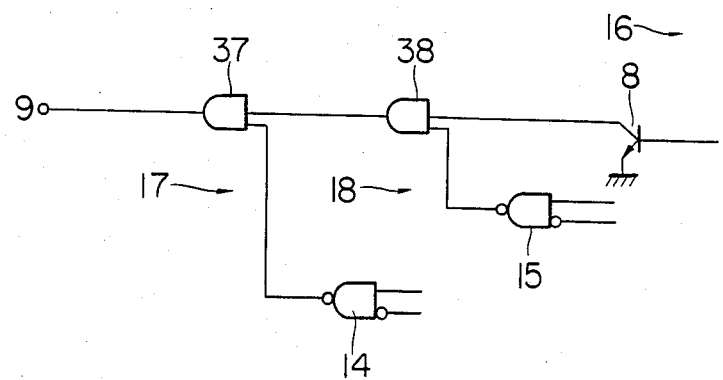
FIG. 2 is a circuit diagram showing the principal part in another embodiment of the present invention.

Referring now to FIG. 2, another embodiment of the present invention is shown, in which only the portion different from that of FIG. 1 is illustrated. The other portion is the same as that of FIG. 1.

In this embodiment, the infinity limit switch means 17 and the minimum-focusing-point limit switch means 18 are connected in series to the displacement monitoring signal generator 16 against the common output terminal 9 through AND gates 37 and 38. In this embodiment, when the lens has been moved to the infinity or minimum-focusing-point, the AND gate 37 or 38 is closed to shut off the displacement monitoring signal, so that a lower-level limit signal is output from the output terminal 9.

Figure 3:
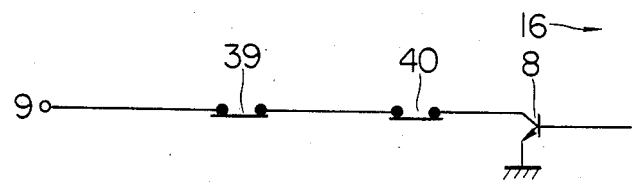
FIG. 3 is a circuit diagram showing the principal part in still another embodiment of the present invention.

FIG. 3 shows still another embodiment of the present invention, in which only the portion different from that of FIG. 1 is illustrated and the other portion is the same as that of FIG. 1.

In the embodiment of FIG. 3, an infinity point limit switch 39 which is turned off at the infinity point and a minimum-focusing-point limit switch 40 which is turned off at the minimum focusing point are connected in series to the displacement monitoring signal generator 16 against the output terminal 9. Only the infinity limit switch 39 corresponds to the infinity limit switch means, and only the minimum-focusing-point limit switch 40 corresponds to the minimum-focusing-point limit switch means, respectively. In this embodiment, the direction of drive at the infinity or minimum-focusing-point is not considered.

It is obvious that the similar effect can be obtained even in the case that a photoelectrical switch or the like as well as a mechanical switch is used as the above-mentioned limit switches 12, 13, 39, and 40.

As described in detail above, in the present invention, when the lens has been moved to the infinity or minimum-focusing-point, the displacement monitoring signal to be generated in accordance with the movement of the lens is inhibited to be transmitted to the output terminal. Therefore, for example, it is possible to prevent the occurrence of the false displacement monitoring signal caused by chattering, where the pulse-like displacement monitoring signal is generated by means of the comb tooth-like code plate and brush. Consequently, in the present invention, it is possible to provide an automatic focusing lens which can reliably detect that the lens is located at the limit position in an automatic focusing apparatus which discriminates that the lens has been moved to either the infinity or minimum-focusing-point, on the basis that the displacement monitoring signal is not provided for a predetermined period of time during the lens driving operation.

The circuit according to the present invention may be preferably applied to a system comprising: a single-lens reflex camera having an automatic focusing apparatus which detects the distance from the camera to an object to be photographed by dividing a picturing light beam transmitted through the lens and detecting a part of the beam divided; and an automatic focusing lens which is detachably mounted to this camera.

What is claimed is:

1. An automatic focusing lens attachable to a camera having a focus-detection device, and adapted to move a focusing lens to a focusing position in accordance with an output from the device when said automatic focusing lens is mounted on the camera, said automatic focusing lens comprising:
    a focusing lens;
    a motor for moving said focusing lens to a focusing position in accordance with the output from the focus-detection device of the camera; and
    a signal circuit for terminating the movement of said focusing lens by said motor, said signal circuit comprising:
        monitoring means for generating a pulse-like monitoring signal in accordance with the movement of said focusing lens;
        output means for presenting the monitoring signal transmitted from said monitoring means to the camera side;
        detecting means for detecting that said focusing lens is moved to a limit location; and
        control means for inhibiting the transmission of said monitoring signal to said output means when said detecting means detects that said focusing leans is moved to the limit location, thereby to make the transmission of a limit signal to said output means possible,.

2. An automatic focusing lens according to claim 1, wherein said automatic focusing lens comprises input means for receiving a focusing signal from the focus detection device; and focusing means for controlling the movement of said focusing lens on the basis of the focusing signal transmitted to said input means.

3. An automatic focusing lens according to claim 2, wherein said automatic focusing lens comprises inhibiting means for inhibiting the transmission of the focusing signal from said input means to said focusing means when said detecting means detects that said focusing lens is moved to a limit location.

4. An automatic focusing lens according to claim 3, wherein said detecting means respectively detects that said focusing lens is moved to the limit locations respectively corresponding to an infinity and a minimum-focusing-point.

5. A signal circuit for an automatic focusing lens attachable to a camera having a focus-detection device, and adapted to move a focusing lens to a focusing position in accordance with an output from the device when the automatic focusing lens is mounted on the camera, said signal circuit comprising:
    monitoring means for generating a pulse-like monitoring signal in accordance with the movement of the focusing lens;
    output means for presenting the monitoring signal transmitted from said monitoring means to the camera side;
    detecting means for detecting that the focusing lens is moved to a limit location; and
    control means for inhibiting the transmission of said monitoring signal to said output means when said detecting means detects that the focusing lens is moved to the limit location, thereby to make the transmission of a limit signal to said output means possible.

6. A signal circuit according to claim 5, wherein said signal circuit comprises input means for receiving a focusing signal from the focus detection device; and focusing means for controlling the movement of the focusing signal on the basis of the focusing signal transmitted to said input means.

7. A signal circuit according to claim 6, wherein said signal circuit comprises inhibiting means for inhibiting the transmission of the focusing signal from said input means to the focusing means when said detecting means detects that the focusing lens is moved to a limit location.

8. A signal circuit according to claim 7, wherein said detecting means respectively detects that the focusing lens is moved to the limit locations respectively corresponding to an infinity and a minimum-focusing-point.

* * * * *

UNITED STATES PATENT AND TRADEMARK OFFICE
CERTIFICATE OF CORRECTION

PATENT NO. : 4,545,664

DATED : October 8, 1985

INVENTOR(S) : SHINJI SAKAI, ET AL.

It is certified that error appears in the above-identified patent and that said Letters Patent is hereby corrected as shown below:

Column 1, line 29, change "Application" to --Applications--.

Column 2, line 8, change "signal not" to --signal does not--.

Column 6, line 11, change "leans" to --lens--;
line 14, change "possible,." to --possible--.

Signed and Sealed this

Second Day of September 1986

[SEAL]

Attest:

DONALD J. QUIGG

Attesting Officer

Commissioner of Patents and Trademarks